Nov. 30, 1943.   R. R. CURTIS   2,335,744
KEY AND KEYWAY CONSTRUCTION
Original Filed Sept. 5, 1941
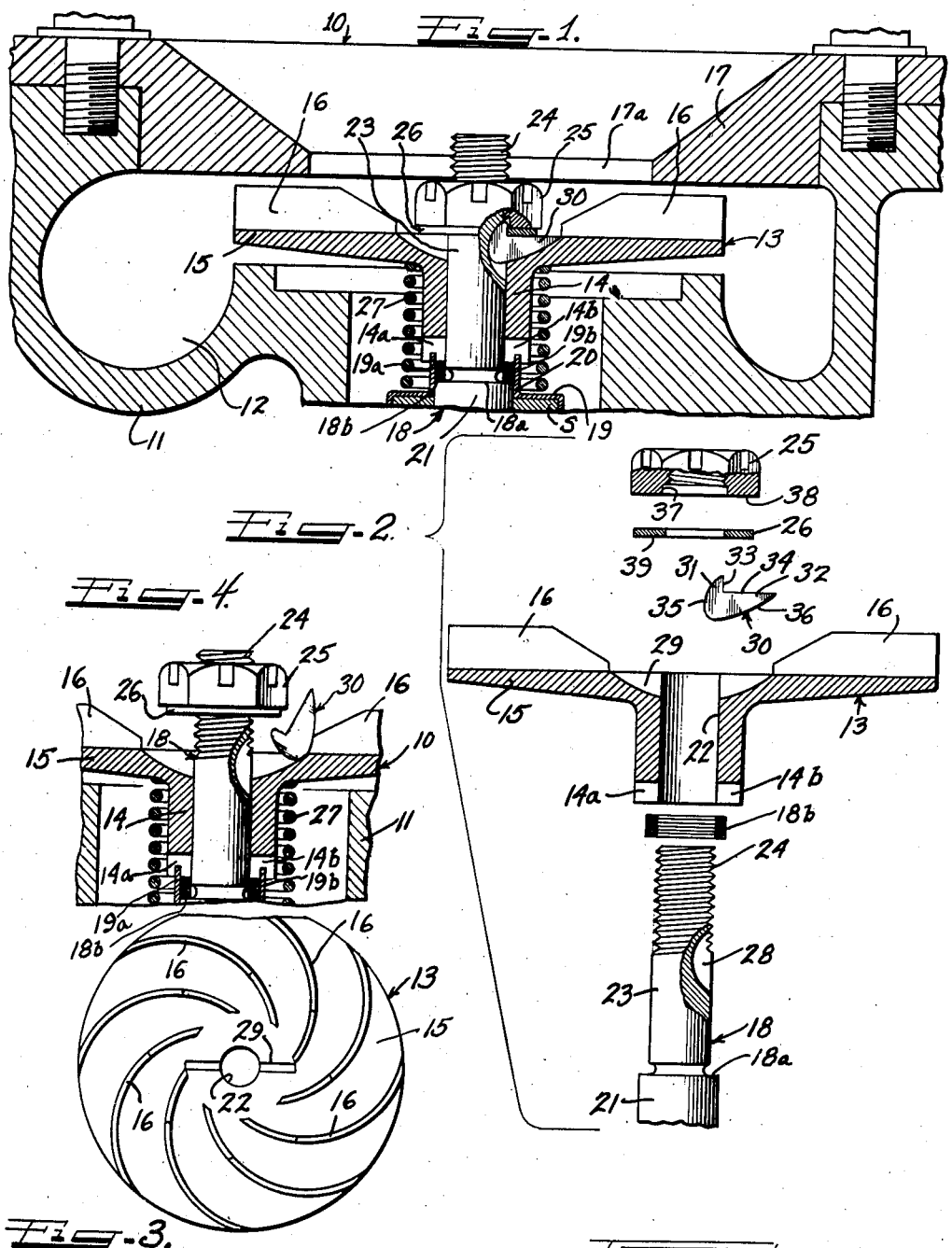
Inventor
RUSSELL R. CURTIS.

Patented Nov. 30, 1943

2,335,744

UNITED STATES PATENT OFFICE 2,335,744

KEY AND KEYWAY CONSTRUCTION

Russell R. Curtis, Dayton, Ohio, assignor to Curtis Pump Company, Dayton, Ohio, a corporation of Ohio Original application September 5, 1941, Serial No. 409,644. Divided and this application February 5, 1942, Serial No. 429,606

4 Claims. (Cl. 287—52.05)

This invention relates to means for securing devices to supports therefor. More particularly, this invention relates to a key and keyway construction for securing an impeller to a pump shaft by which the key may be applied and removed without disassembly of the associated elements.

This application is a division of my co-pending application entitled "Pump construction," filed September 5, 1941, U. S. Serial No. 409,644.

While the invention will be described hereinafter as being particularly applicable for securing an impeller to a pump shaft, it is to be understood that it is broadly applicable for securing any device such as gears, pulleys, cams, cranks, rollers and the like, to shafts or other similar supports therefor.

Numerous devices for securing driving or driven elements on a shaft are known, such as flat, tapered or curved keys, dowel pins, set screws, cotter pins and the like. Frequently, the removal of the driving or driven elements from shafts to which they have been secured has been exceedingly difficult either due to the elements being frozen on the shafts or because the securing devices have become battered and distorted in use.

Generally speaking, the present invention provides improved removable means for securing a pump impeller on a shaft. The impeller is bored to slidingly fit on the shaft and to seat on a shoulder thereon. If desired, shims may be inserted between the impeller and shaft shoulder to properly position the impeller longitudinally along the shaft. The free end of the shaft is threaded for receiving a nut which secures the impeller on the shaft either against its shoulder or against the adjusting shims thereon.

Both the shaft and impeller have keyways provided therein with the keyway on the shaft extending longitudinally along the shaft a greater distance than the depth of the keyway in the impeller. When the keyways are in proper alignment in radial and axial directions relative to the shaft, an L-shaped key is inserted therein. One leg of the key seats in the keyway in the impeller while the other leg of the key seats in the keyway in the shaft and extends above the top of the impeller. A washer is passed over the end of the shaft where it embraces the upwardly extending key leg and seats on the key leg in the impeller keyway. The nut, having a recess in its lower face, is threaded on the shaft against the washer thereby locking the key within the keyways. Removal of the key from the registered keyways is effected by threading the nut towards the end of the shaft a distance sufficient to provide clearance for the withdrawal of the key.

It is, therefore, an object of this invention to provide an improved mounting construction for securing relatively movable members together.

Another object of this invention is to provide a key for insertion in and removal from registered keyways in relatively movable members without disassembly of one member from its mounted position on the other member.

A still further object of this invention is the provision of a key and keyway construction for securing a pump impeller to a shaft which shaft has an abutment for seating the impeller and a nut threaded thereto for locking the key in the keyway and the impeller on the shaft.

Another and still further object of this invention is the provision of keyways in a shaft and an impeller which, when in alignment, receives an L-shaped key therein having one leg seated in the impeller keyway and another leg seated in the shaft keyway and extending above the impeller with a recessed nut threaded to the shaft to embrace the other leg of the key and to seat on the one leg of the key to lock the impeller to the shaft.

Another object of this invention is the provision of a key and keyway construction for securing an impeller to a shaft with a nut threaded to the shaft for embracing one portion of the key and for seating against another portion thereof, the parts being so arranged that turning of the nut away from the impeller provides sufficient clearance for disassembly of the key and keyway construction without the need of disassembling the impeller from the shaft.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawing, in which:

Figure 1 is a fragmentary view in vertical section, with parts in elevation, illustrating the manner in which the impeller of a centrifugal pump is secured to a driving shaft in accordance with the principles of this invention;

Figure 2 is an exploded side elevational view, with portions broken away and cross sectioned, illustrating parts of Figure 1 in a disassembled relation;

Figure 3 is a fragmental top plan view of the pump impeller illustrated in Figures 1 and 2 for the purpose of showing the keyway provided therein; and, Figure 4 is a view similar to Figure 1 showing the relation of parts when the locking nut has been moved to a position whereby the key may be inserted or removed from the registered keyways of the impeller and shaft.

The following description relates specifically to the manner in which a sliding impeller is secured to the driving shaft of a centrifugal pump. It is to be understood, however, that the securing means to be defined may be used in connection with the securing together of any type of member mounted on another member.

As best shown in Figure 1, the pump construction 10 includes a casing 11 which is so shaped as to define an internal volute chamber 12 through which fluids may be pumped by an impeller 13. The impeller 13 comprises a hub 14, a flat disk flange 15, and a series of upstanding radially curved vanes 16 (Fig. 3) projecting from the flange 15 toward a throat ring 17 mounted on the pump casing. The throat ring 17 defines an inlet throat or opening 17a to the impeller.

A driving shaft 18 has the impeller mounted and secured thereon in a manner to be more fully described as follows:

The shaft 18 is connected to a source of motive power (not shown). A cup-shaped abutment member 19 has a reduced neck 20 slidably surrounding a portion 21 of the shaft 18 and also has an enlarged skirted end forming an abutment seat. Axially extending tangs or fingers 19a and 19b, on the reduced end 20 of the cup member 19, engage within slots 14a and 14b provided in the lower end of the impeller hub 14 to form a positive drive connection between the impeller and the cup member.

The impeller 13 is bored as at 22 to slidingly receive therethrough the reduced portion 23 of the shaft 18 at the lower end of which is an abutment shoulder 18a. Normally, the lower end of the impeller hub 14 seats against the abutment shoulder on the shaft. However, shims 18b may be inserted between the end of the impeller hub and the shaft shoulder if necessary to adjust the impeller along the shaft to a position in which proper clearance is provided between the impeller and the pump casing and between the impeller and the throat ring. It is to be noted that the shims 18b seat within the reduced end 20 of the cup member 19 without interfering in any way with the cooperation of the tangs 19a and 19b and the slots 14a and 14b in the impeller hub. The shaft terminates in a threaded end 24 to receive thereon a threaded abutment nut 25. A washer 26 embraces the shaft 18 between the nut 25 and the impeller disk 15. With the parts assembled as in Figure 1, the nut 25 forces the impeller tightly against the shimmed or unshimmed shoulder 18a on the shaft to lock the impeller against relative axial movement on the shaft.

A coil spring 27 embraces the impeller hub 14 and has one end seated on the skirted end of the cup member 19 and its other end engaging the underside of the impeller disk 15. The cup member 19 is limited in its axial movement relative to the shaft 18 so that the interposed coil spring 27 exerts a constant force against the cup member for maintaining a pair of relatively movable seal members in sliding face engagement. As the seal construction forms no part of the present invention, only one seal member S is shown.

The shaft 18 is provided with a longitudinally extending partially circular keyway 28, such as used with Woodruff keys. A radially extending segmental circular keyway 29 is formed in the top face of the impeller flange 15 by means of a circular milling cutter. It is to be noted that the keyway 28 is considerably longer than the depth of the keyway 29 for a purpose to be more apparent from the following description.

When the keyways 28 and 29 are in registry a key 30 is seated therein for securing the impeller to the shaft to eliminate relative rotation therebetween.

The key 30 is formed of right angularly extending portions 31 and 32 with the latter portion being longer than the former. The adjacent inner edges 33 and 34 are flat and in right angular relation for a purpose to be more fully described hereinafter. The adjacent outer edges 35 and 36 are curved to complementally engage the bottom surfaces respectively of the keyways 28 and 29.

As best shown in Figure 2, the nut 25 is recessed as at 37 on its inner periphery adjacent the face 38. When the parts are assembled as shown in Figure 1 and in the order shown in Figure 2, the key portion 32 seats within the keyway 29 in the impeller while the portion 31 of the key seats within the upper portion of the keyway 28 in the shaft. In this manner, the key portion 31, extending above the key portion 32, lies within and in engagement with the inner periphery of the washer 26 and of the recess 37 in the nut 25. Pressure exerted by the locking nut 25 thereby maintains the portions of the key 30 in the respective keyways and seated against the face 39 of the washer 26 and the inner peripheries of the washer and of the recess 37 in the nut.

The parts described above coact to secure the impeller 13 to the shaft 18 to eliminate relative rotation therebetween.

An important feature of the present invention is in the ability to insert or remove the key 30 from operative cooperation with its associated parts without disassembling such parts. As illustrated in Figure 4, it is only necessary to turn the locking nut in a loosening direction or away from the impeller a sufficient distance to provide clearance for the key portion or leg 31. The entire key may then be inserted in the aligned keyways or removed therefrom. Once the key is inserted in the keyways and the locking nut threaded home, the impeller is locked to the shaft to prevent relative axial and rotative movements therebetween.

It will be apparent from the foregoing that the present invention provides a key and keyway construction for securing an impeller to a shaft with the key having right angular portions both of which are locked in place by a nut threaded to the shaft for abutment with the key whereby the impeller is locked to the shaft against relative axial and rotational movements therebetween. Insertion or removal of the key into or out of the keyways provided in the shaft and impeller is effected by merely loosening the locking nut and turning it away from the impeller a distance sufficient to provide clearance for the key and this insertion or removal of the key may be effected without disassembling any of the other parts from the shaft.

While a particular embodiment only of this invention has been illustrated, it will, of course, be understood that the invention should not be limited thereto, since many modifications may be made, and therefore it is contemplated by the appended claims to cover all such modifications as fall within the true spirit and scope of the present invention.

I claim as my invention:

1. In a pump assembly, a driving shaft having an abutment shoulder, an impeller slidably mounted on said shaft, shims between said shoulder and impeller for positioning said impeller at a predetermined position on said shaft, a nut having an enlarged inner recess at one end thereof and threaded on said shaft for holding said impeller against said shims, a washer between said nut and said impeller, a radially extending segmental circular keyway in that face of said impeller which engages said washer, an axially extending segmental circular keyway in said shaft of greater length than the depth of the keyway in said impeller, and an L-shaped key having the legs thereof seated in said keyways, adjacent inner edges of said legs being in right angular relation and the adjacent outer edges thereof being curved to seat in said keyways, one of the legs of said key extending upwardly above the impeller through said washer and into the recess of said nut whereby said right angular edges of the key seat within the nut and washer and against the lower face of the washer, said key being insertable and removable from said keyways when said nut is moved away from said impeller to provide clearance in excess of the length of said one leg of the key.

2. An article of manufacture comprising a shaft, a member to be secured on said shaft, an axially extending keyway in said shaft, a keyway in said member extending in a direction radially of said shaft when said member is secured thereon and being of less depth than the length of the keyway on said shaft, said keyways adapted to be placed in registering relation, a key having right angularly extending portions shaped to complementally seat in said keyways, a washer surrounding said shaft having its inner periphery in engagement with one key portion and being seated on said other key portion, and a locking nut carried by said shaft and having an inner recess, said nut being threaded against said washer and receiving the key portion from the washer within its recess whereby said key portions are locked within said keyways.

3. In a pump assembly, a driving shaft having a threaded portion and an abutment shoulder in spaced relation from said threaded portion, an impeller having a hub on said shaft in thrusting relation with said shoulder, a nut threaded on the threaded portion of said shaft for thrusting on said impeller to hold the impeller in clamped relation between said shoulder and said nut, said impeller having a radially extending segmental circular keyway therein, said shaft having an axially extending segmental circular keyway therein of greater length than the depth of the keyway in said impeller, and an L-shaped key having the legs thereof seated in said keyways with one of the legs extending into the nut to hold the key against radial displacement and the other of the legs being thrust upon by the nut to hold the key against axial displacement, and said key having curved edges respectively fitting the segmental circular keyways of said shaft and impeller adapting the key to be rocked into and out of operative position whenever said nut is moved away from the impeller to provide clearance for said rocking.

4. In a pump assembly, a driving shaft having a shoulder thereon, an impeller mounted on said shaft for thrusting against said shoulder, registered keyways in said shaft and said impeller, said keyway in said impeller increasing in depth as it approaches said shaft, a key slidably mounted in said keyway of the impeller, and a nut threaded on said shaft to thrust against said key for sliding the same into wedging engagement in the keyway of the shaft.

RUSSELL R. CURTIS.